United States Patent [19]
Gupta et al.

[11] Patent Number: 5,140,093
[45] Date of Patent: Aug. 18, 1992

[54] MELT-PROCESSABLE THERMOTROPIC POLYESTERS HAVING FLUORINE CONTAINING LINKING GROUPS

[75] Inventors: Balaram Gupta, No. Plainfield; Larry F. Charbonneau, Medham; Gordon W. Calundann, No. Plainfield; Tai-Shung Chung, Randolph, all of N.J.

[73] Assignee: Hoechst Celanese Corp., Somerville, N.J.

[21] Appl. No.: 729,968

[22] Filed: Jul. 15, 1991

[51] Int. Cl.$^5$ .................. C08G 63/00; C08G 63/02; C08G 65/38
[52] U.S. Cl. .................. 528/193; 528/176; 528/194; 528/219; 528/272
[58] Field of Search .............. 528/176, 193, 194, 219, 528/272

[56] References Cited

U.S. PATENT DOCUMENTS 4,866,155  9/1989  Mueller et al. .................. 528/191

Primary Examiner—Nathan M. Nutter
Assistant Examiner—T. Mosley
Attorney, Agent, or Firm—Michael W. Ferrell

[57] ABSTRACT

Novel thermotropic polyesters and polyester-amides containing fluorine bearing linking groups are disclosed and claimed. Preferred embodiments include thermotropic polymers prepared from 4-Hydroxybenzoic acid, 6-hydroxy-2 naphthoic acid, 2,2-bis(4-carboxyphenyl)-hexafluoropropane, hydroquinone, and terephthalic acid.

17 Claims, No Drawings

MELT-PROCESSABLE THERMOTROPIC POLYESTERS HAVING FLUORINE CONTAINING LINKING GROUPS

TECHNICAL FIELD

The present invention relates generally to high performance liquid-crystal polyester resins and more specifically to melt-polymerizable polyesters capable of forming an anisotropic melt phase.

BACKGROUND OF INVENTION

Liquid crystalline or thermotropic polyesters capable of forming an anisotropic melt are known high performance materials useful for manufacturing films, fibers, molded articles and like items. While these materials typically exhibit superior temperature resistance and mechanical properties as compared to commodity resins, they are often times difficult to synthesize and melt-process due to a tendency to become intractable if the composition is not carefully controlled, or alternatively, desirable properties as aforementioned can be lacking if the ratio and/or selection of components is not within critical ranges.

Various attempts have been made to improve the processability and/or mechanical properties of liquid crystalline polyesters, including by the incorporation of amide or other linkages into such polymers.

U.S. Pat. No. 4,617,369 discloses polyesters containing units derived from 3,4' dihydroxybenzophenone, an aromatic diacid, and suggests other components including hydroxy-acids and 2,2 bis(parahydroxyphenyl)hexafluoropropane as part of the reaction mixture.

Thermotropic polyesters based on hydroxy-acids are well known and generally exhibit superior processability albeit with a sometimes less than desirable melting point and/or use temperature depending upon composition. Moreover, thermotropic polyesters formed from hydroxy-acids are typically more easily synthesized than corresponding polymers made principally from diols and diacids. This is believed due to both the inherent stoichiometric ratio of these monomers and perhaps the purity with which they are prepared.

SUMMARY OF INVENTION

It has been found that by incorporating certain fluorine-containing monomers into liquid crystalline polyester systems that increased temperature resistance is achieved. The polyesters made in accordance with the present invention may include minor amounts of other linkages, such as amide functionalities as hereinafter described. Specifically, it has been found that incorporating less than about 15 mole per cent of a fluorinated diaryl moiety may increase temperature resistance and enhance electrical properties without detrimental effects on melt-polymerizability.

In preferred embodiments, polyesters of the present invention are those consisting essentially of recurring moieties I, II and III wherein moiety I is

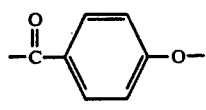

or is

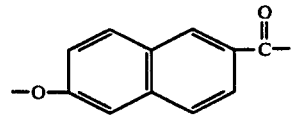

or mixtures thereof; moiety II is

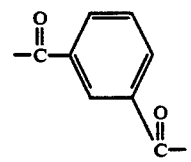

or

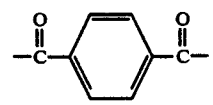

or

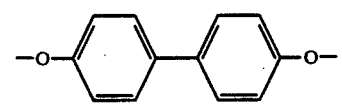

or

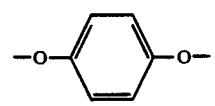

or mixtures thereof; and moiety III is

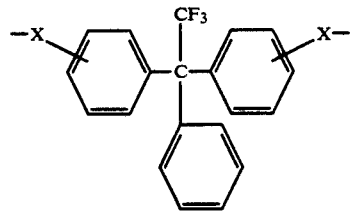

or

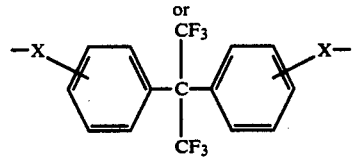

For the moieties of group III, X represents a nitrogen atom, oxygen atom, the residue of a carboxyl group, or mixtures thereof. The moieties of group I are present in an amount of from about 80 to about 40 mole per cent, while the moieties of groups II and III are present in an amount of from about 5 to about 20 mole per cent. Moiety III may include the recurring units

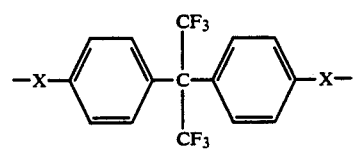

-continued or

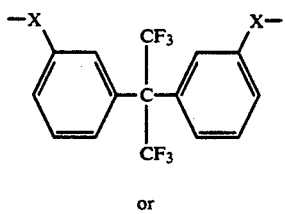

or

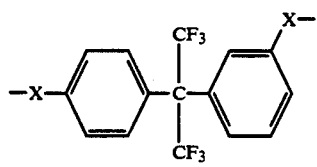

Monomers for these structural units in the form of fluorinated diamines, diacids, diols, acid-amines, alcohol-amine, or acid-alcohols are available through Hoechst-Celanese Corporation, 86 Morris Avenue, Summit, N.J. 07901 or can be readily made from existing materials by conventional techniques.

Particularly preferred species for the group III moiety are shown as structures 1-6 below.

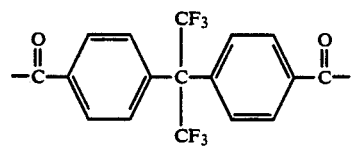 (1)

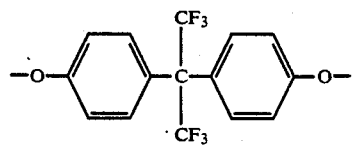 (2)

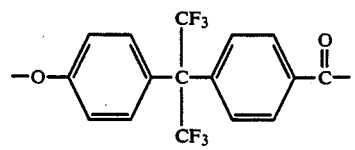 (3)

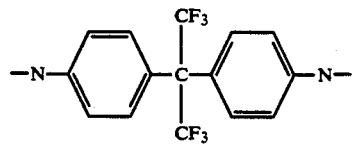 (4)

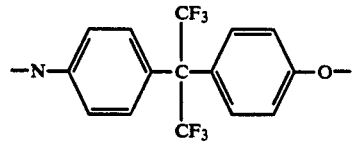 (5)

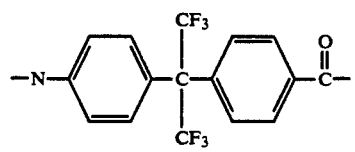 (6)

Generally the polyesters of the present invention have a melting point of at least about 240° C. and relatively high melt viscosities.

More preferably, the polyesters have a melt viscosity of at least about 1000 poise at a shear rate of 1000 sec$^{-1}$ at a temperature of about 350° C.

DETAILED DESCRIPTION

As will be readily apparent, the present invention is illustrated in the examples which follow, but is defined only by the appended claims. The examples are provided for purposes of exemplification only and not for purposes of limitation.

EXAMPLE 1

A cylindrical one liter round-bottomed glass reactor was provided which was equipped with a nitrogen inlet, a thermocouple, Vigreux column attached to a condenser and receiver, and a C-shaped 316 stainless steel mechanical stirrer. The reactor was immersed in a sand bath and provided with means to accurately control the temperature. Into the reactor were placed 39.2 grams (0.1 moles) of 2,2-bis(4-carboxyphenyl) hexafluoropropane (6FDCA), 16.6 grams (0.1 moles) of terephthalic acid (TA), 112.9 grams (0.6 moles) of 6-hydroxy-2-naphthoic acid (HNA), 22.6 grams (0.205 moles) of 1,4-hydroquinone (HQ), and 0.06 grams (302 ppm) of potassium acetate as polycondensation catalyst. The reactor was under a constant purge of nitrogen at a rate of approximately 30 to 40 c.c./minute while being charged. The reactor was next evacuated to approximately 1 to 2 mbar two times with the reduced pressure being broken with nitrogen each time.

Acetic anhydride next was introduced into the reactor through an addition funnel in a quantity of 106.8 grams (1.025 moles including a 2.5 mole percent excess). Such acetic anhydride was of 98 mole percent purity and was added for the purpose of converting the phenolic hydroxy function into acetate prior to the onset of polymerization.

Through the use of a MicRIcon® controller the contents of the reactor while stirred were heated in stages as indicated below while under a purge of nitrogen at a rate of 30 to 40 c.c./minute.

TABLE I

| Temperature Profile of Synthesis | | |
|---|---|---|
| Heating Stage No. | Temperature in °C. | Time at Temperature (minutes) |
| 1 | 25 | 1 |
| 2 | 125 | 60 |
| 3 | 150 | 50 |
| 4 | 200 | 50 |
| 5 | 250 | 50 |
| 6 | 300 | 100 |
| 7 | 330 | 40 |
| 8 | 340 | 20 |
| 9 | 340 | 15 |
| 10 | 340 | 60 |

The acetic acid began distilling-off when the reactor was at 150° C. and at the beginning of heating stage No. 7 approximately 98 percent of the theoretical amount (115 ml.) had evolved.

At the beginning of heating stage No. 9 the reactor was evacuated to approximately 1 to 2 mbar. The torque on the stirrer started to rise. In approximately 40 minutes the torque rose from about 27 mvolts to 56 mvolts at substantially constant speed and torque did not rise any more. The reactor was cooled and was opened to obtain the resulting polymer. The polymer was cut and ground into chips to yield 159.6 grams of product (92 percent of theoretical).

The resulting product was found to exhibit an inherent viscosity of 5.65 dl./g when dissolved in a concentration of 0.1 percent by weight in equal parts by volume of hexafluoroisopropanol and pentafluorophenol at 25° C. The product also was found to exhibit the following properties as determined by standard differential scanning calorimetry at 20° C./min. heating rate:

Melting Point $(T_m) = 297°$ C.,
Heat of Melting $(H_m) = 1.0$ joules/gram.
Glass Transition Temperature—not observed
Crystallization Point $(T_c) = 243°$ C., and
Heat of Crystallization $(H_c) = -1.3$ joules/gram.

The melt viscosity of the product at 360° C. was 4722 poise at a shear rate of 100 sec.$^{-1}$, and 1346 poise at a shear rate of 1000 sec.$^{-1}$. The product when melted exhibited a fine uniform nematic microstructure by thermal-optical microscopy and this texture was retained after quenching at ambient temperature.

While at a temperature of 330° C. the molten product was extruded through a single hole spinneret (0.005 in. diameter ×0.007 in. at a throughput rate of 0.1 gram/minute). The resulting as-spun filament was quenched in ambient air (25° C. and 65 percent relative humidity) prior to windup at a speed of 6 meters/minute.

A section of the resulting as-spun fiber had a denier of 8 and exhibited the following average single filament properties:

| | |
|---|---|
| Tenacity (grams per denier) | 5.2 |
| Initial modulus (grams per denier) | 258 |
| Elongation (percent) | 2.2 | according to ASTM D 3822.

EXAMPLE 2

Example 1 was substantially repeated except for the amounts of the monomers used as specified below:

| | |
|---|---|
| HNA (0.7 moles) | 131.7 grams |
| HQ (0.155 moles) | 17.1 grams |
| 6FDCA (0.15 moles) | 58.8 grams |

The polymer became highly viscous by the time the reactor reached 340° C. and could not be melt polymerized below about 350° C. The reactor was cooled as was opened to obtain the resulting oligomeric product. The oligomer was ground into powder to yield 192.3 grams of product (101 percent of theoretical). The product was used as such in the following example as an additional reactant.

EXAMPLE 3

Example 1 was substantially repeated except for the amounts of the monomers used as specified below:

| | |
|---|---|
| HNA (1.4 moles) | 263.5 grams |
| HQ (0.31 moles) | 34.1 grams |
| TA (0.3 moles) | 49.8 grams |
| Oligomeric product (from Example 2) | 169.5 grams |
| Potassium acetate | 0.11 grams |
| Acetic anhydride | 213.6 grams |

The acetic acid began distilling-off when the reactor was at 150° C. and at the beginning of heating stage No. 9 approximately 99 percent of the theoretical amount (232 ml.) had evolved.

At the beginning of heating stage No. 10 the reactor was evacuated to approximately 1 to 2 mbar. The torque on the stirrer started to rise. In approximately 50 minutes the torque rose from about 30 mvolts to 66 mvolts and torque did not rise any more. The reactor was cooled and was opened to obtain the resulting polymer. The polymer was cut and ground into chips to yield 396.2 grams of product (83 percent of theoretical).

The resulting product was insoluble in equal parts by volume of hexafluoroisopropanol and pentafluorophenol and thus solution viscosity could not be determined. The product was found to exhibit the following properties as determined by standard differential scanning calorimetry at 20° C./min. heating rate:

Melting Point $(T_m) = 301°$ C.,
Heat of Melting $(H_m) = 0.74$ joules/gram.
Glass Transition Temperature—not observed.
Crystallization Point $(T_c) = 244°$ C., and
Heat of Crystallization $(H_c) = -1.7$ joules/gram The melt viscosity of the product at 330° C. was 6144 poise at a shear rate of 100 sec.$^{-1}$, and 1293 poise at a shear rate of 1000 sec.$^{-1}$. The product when melted exhibited a fine uniform nematic microstructure by thermal-optical microscopy and this texture was retained after quenching at ambient temperature.

While at a temperature of 390° C. the molten product was extruded through a single hole spinneret (0.005 in. diameter ×0.007 in. at a throughput rate of 0.4 gram/minute). The resulting as-spun filament was quenched in ambient air (25° C. and 65 percent relative humidity) prior to windup at a speed of 6 meters/minute.

A section of the resulting as-spun fiber had a denier of 5 and exhibited the following average single filament properties:

| | |
|---|---|
| Tenacity (grams per denier) | 4.7 |
| Initial modulus (grams per denier) | 363 |
| Elongation (percent) | 1.6 | according to ASTM D 3822.

The fiber was then heat treated first at 250° C. for 2 hours and then heated to 290° C. for 16 hours. The heat treated fiber exhibited the following average single filament properties:

| | |
|---|---|
| Tenacity (grams per denier) | 10 |
| Initial modulus (grams per denier) | 391 |
| Elongation (percent) | 2.9 | according to the same test method.

EXAMPLE 4

Example 1 was substantially repeated except for the amounts of the monomers used as specified below:

| | |
|---|---|
| HNA (0.6 moles) | 112.9 grams |
| HQ (0.205 moles) | 22.6 grams |
| 6FDCA (0.2 moles) | 78.5 grams |

The polymer became highly viscous by the time the reactor reached 300° C. The stirring was stopped and continued heating to 340° C. Again, the composition could not be melt-polymerized below about 350° C. and thus would not be readily melt-processable at 330° C. even if it were solid-stated into a polymer. The reactor was evacuated to 1 to 2 mbar for about 10 minutes. The reactor was cooled and was opened to obtain the resulting oligomeric product. The oligomer was ground into powder to yield 194.2 grams of product (99 percent of theoretical). The product was used as such in the following example as an additional reactant.

EXAMPLE 5

Example 1 was substantially repeated except for the amounts of the monomers used as specified below:

| | |
|---|---|
| HNA (0.6 moles) | 112.9 grams |
| HQ (0.205 moles) | 22.6 grams |
| TA (0.2 moles) | 33.2 grams |
| Oligomeric product (from Example 4) | 168.3 grams |
| Potassium acetate | 0.05 grams |
| Acetic anhydride | 106.8 grams |

The acetic acid began distilling-off when the reactor was at 150° C. and at the beginning of heating stage No. 9 approximately 98 percent of the theoretical amount (115 ml.) had evolved.

At the beginning of heating stage No. 9 the reactor was evacuated to approximately 1 to 2 mbar. The torque on the stirrer started to rise. In approximately 30 minutes the torque rose from about 37 mvolts to 44 mvolts and began to drop thereafter. The reactor was cooled and was opened to obtain the resulting polymer. The polymer was cut and ground into chips to yield 290.8 grams of product (91 percent of theoretical).

The resulting product was found to exhibit an inherent viscosity of 2.73 dl./g. when dissolved in equal parts by volume of hexafluoroisopropanol and pentafluorophenol at 25° C. The product was found to exhibit the following properties as determined by standard differential scanning calorimetry at 20° C./min. heating rate:

Melting Point $(T_m) = 278$ and $287°$ C.,
Heat of Melting $(H_m) = 1.4$ joules/gram.
Glass Transition Temperature—not observed.
Crystallization Point $(T_c) = 225°$ C., and
Heat of Crystallization $(H_c) = -2.0$ joules/gram The melt viscosity of the product at 330° C. was 1325 poise at a shear rate of 100 sec.$^{-1}$, and 457 poise at a shear rate of 1000 sec.$^{-1}$. The product when melted exhibited a fine uniform nematic microstructure by thermal-optical microscopy and this texture was retained after quenching at ambient temperature.

EXAMPLE 6

Example 1 was substantially repeated except for the amounts of the monomers used as specified below:

| | |
|---|---|
| 4-Hydroxybenzoic acid (HBA) (0.52 moles) | 71.8 grams |
| HNA (0.28 moles) | 52.7 grams |
| HQ (0.105 moles) | 11.6 grams |
| 6FDCA (0.1 moles) | 39.2 grams |
| Potassium acetate (302 ppm) | 0.053 grams |
| Acetic anhydride | 106.8 grams |

The acetic acid began distilling-off when the reactor was at 150° C. and at the beginning of heating stage No. 8 approximately 98 percent of the theoretical amount (115 ml.) had evolved.

At the beginning of heating stage No. 10 the reactor was evacuated to approximately 1 to 2 mbar. The torque on the stirrer started to rise very rapidly just in about 15 minutes. The reactor was cooled and was opened to obtain the resulting polymer. The polymer was cut and ground into chips to yield 155.6 grams of product (99 percent of theoretical).

The resulting product was insoluble in equal parts by volume of hexafluoroisopropanol and pentafluorophenol and thus solution viscosity could not be determined. The product was found to exhibit the following properties as determined by standard differential scanning calorimetry at 20° C./min. heating rate:

Melting Point $(T_m) = 240°$ C.,
Heat of Melting $(H_m) = 0.24$ joules/gram.
Glass Transition Temperature—not observed.
Crystallization Point $(T_c) = 190°$ C., and
Heat of Crystallization $(H_c) = -0.7$ joules/gram.

The melt viscosity of the product at 360° C. was 2519 poise at a shear rate of 100 sec.$^{-1}$, and 760 poise at a shear rate of 1000 sec.$^{-1}$. The product when melted exhibited a fine uniform nematic microstructure by thermal-optical microscopy and this texture was retained after quenching at ambient temperature.

While at a temperature of 360° C. the molten product was extruded through a single hole spinneret (0.005 in. diameter ×0.007 in. at a throughput rate of 0.4 gram/minute). The resulting as-spun filament was quenched in ambient air (25° C. and 65 percent relative humidity) prior to windup at a speed of 6 meters/minute.

A section of the resulting as-spun fiber had a denier of 16 and exhibited the following average single filament properties:

| | |
|---|---|
| Tenacity (grams per denier) | 1.0 |
| Initial modulus (grams per denier) | 123 |
| Elongation (percent) | 0.9 | as measured by test method ASTM D 3822.

The fiber was then heat treated first at 230° C. for 2 hours and then heated to 280° C. for 16 hours. The heat treated fiber exhibit the following average single filament properties:

| | |
|---|---|
| Tenacity (grams per denier) | 1.6 |
| Initial modulus (grams per denier) | 92 |
| Elongation (percent) | 2.2 | in accordance with the same test method.

The melting points and compositions of the polymers of the foregoing examples are summarized in Table II below.

TABLE II

Summary of Compositions and Melting Points

| Polymers of Example | Approximate Composition (Mole Per Cent) | Melting Point °C. |
|---|---|---|
| I | 60% HNA:10% 6FDCA:10% TA:20% HQ | 297° |
| II | 70% HNA:15% 6FDCA:15% HQ | — |
| III | 70% HNA:5% 6FDCA:10% TA:15% HQ | 301° |
| IV | 60% HNA:20% 6FDCA:20% HQ | — |
| V | 60% HNA:101% 6FDCA:10% TA:20% HQ | 287° |
| VI | 30% HNA:50% HBA:10% 6FDCA:10% HQ | 240° |

As will be appreciated by one of skill in the art, various modifications and substitutions are possible within the scope of the present invention which is limited and defined only by the appended claims.

What is claimed:

1. A melt-processable polyester capable of exhibiting an anisotropic melt comprising recurring units of groups I, II and III wherein group I is

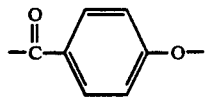

or

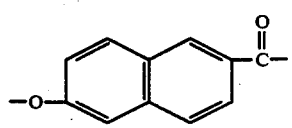

or mixtures thereof;
group II corresponds to the residue of an aromatic diacid or diol and has the structure:

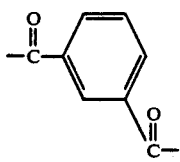

or

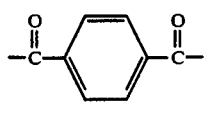

or

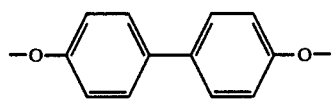

or

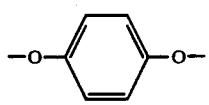

or mixtures thereof; and group III is

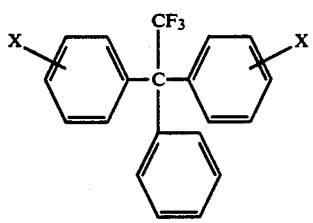

or

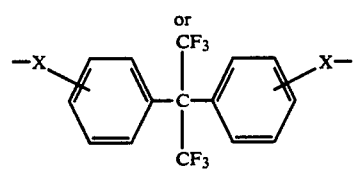

or

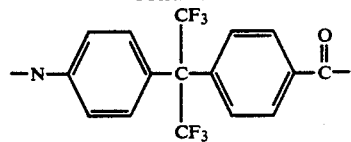

or mixtures thereof,
wherein X represents a nitrogen atom, oxygen atom, the residue of a carboxyl group, or mixtures thereof; the moieties of group I being present in an amount of from about 80 to about 40 mole percent, the moieties of group II being present in an amount of from about 5 to about 20 mole per cent and the moieties of group III being present in an amount of from about 5 to about 20 mole per cent.

2. The polyester according to claim 1, wherein group III includes the recurring unit:

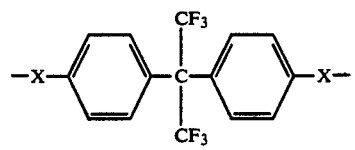

3. The polyester according to claim 1, wherein group III includes the recurring unit:

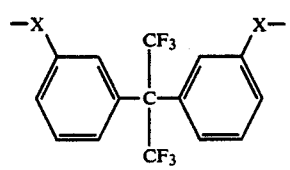

4. The polyester according to claim 1, wherein group III includes the recurring unit:

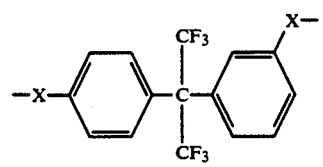

5. The polyester according to claim 1, wherein group III includes the recurring unit:

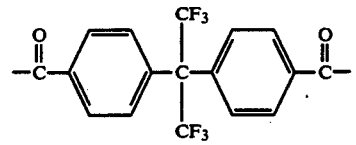

6. The polyester according to claim 1, wherein group III includes the recurring unit:

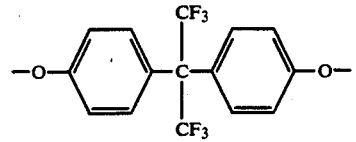

7. The polyester according to claim 1, wherein group III includes the recurring unit:

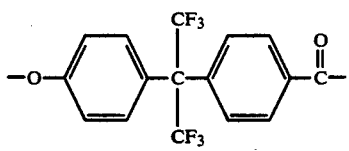

8. The polyester according to claim 1, wherein group III includes the recurring unit:

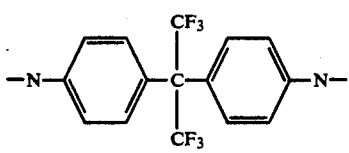

9. The polyester according to claim 1, wherein group III includes the recurring unit:

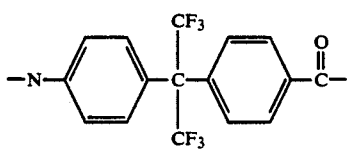

10. The polyester according to claim 1, wherein group I moieties are present from about 60 to about 80 mole percent and consists of a mixture of naphthoyl and benzoyl moieties.

11. The polyester according to claim 1, wherein group III includes a hexafluoroisopropylidene moiety derived from 2,2-bis(4-carboxyphenyl)hexafluoropropane.

12. The polyester according to claim 1, wherein said polyester has a melting point of at least about 240° C.

13. The polyester according to claim 1, wherein said polyester has a melt viscosity of at least about 500 poise at a shear rate of 1000 sec$^{-1}$ at a temperature of about 350° C.

14. The polyester according to claim 1, wherein said polyester has a melt viscosity of at least about 1000 poise at a shear rate of 1000 sec$^{-1}$ at a temperature of about 350° C.

15. A fiber formed from the polymer of claim 1.

16. A heat-treated fiber formed from the polymer of claim 1.

17. A melt-processable polyester consisting essentially of recurring units selected from groups I, II and III wherein group I is

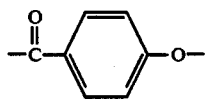

or

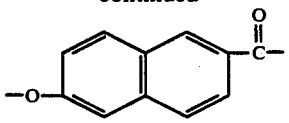

or mixtures thereof;
group II is

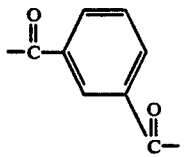

or

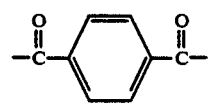

or

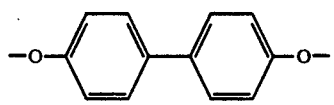

or

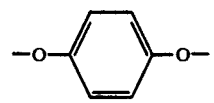

or mixtures thereof; and group III is

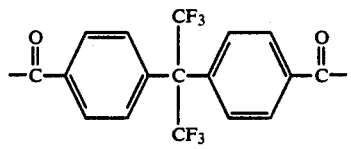

or

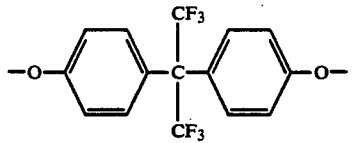

or

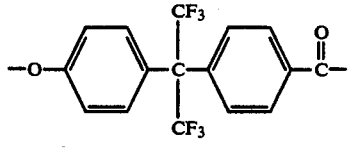

or mixtures thereof;
the moieties of group I being present in an amount of from about 80 to about 40 mole per cent, the moieties of group II being present in an amount of from about 5 to about 20 mole per cent and the moieties of group III being present in an amount of from about 5 to about 20 mole per cent.

* * * * *